US006950905B2

(12) United States Patent
Wu et al.

(10) Patent No.: US 6,950,905 B2
(45) Date of Patent: Sep. 27, 2005

(54) WRITE POSTING MEMORY INTERFACE WITH BLOCK-BASED READ-AHEAD MECHANISM

(75) Inventors: Chia Y. Wu, Newark, CA (US); Walter T. Nixon, Fremont, CA (US); John D. Acton, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 274 days.

(21) Appl. No.: 10/370,428

(22) Filed: Feb. 20, 2003

(65) Prior Publication Data

US 2004/0168026 A1 Aug. 26, 2004

(51) Int. Cl.[7] .............................................. G06F 12/00
(52) U.S. Cl. ....................... 711/137; 711/154; 711/167; 712/237; 710/52
(58) Field of Search ............................... 711/137, 154, 711/163, 167; 710/26, 52, 310; 712/237

(56) References Cited

U.S. PATENT DOCUMENTS

| | | | |
|---|---|---|---|
| 5,689,646 A | 11/1997 | Thorson | |
| 5,689,661 A | 11/1997 | Hayashi et al. | |
| 5,701,416 A | 12/1997 | Thorson et al. | |
| 5,720,025 A | 2/1998 | Wilkes et al. | |
| 5,737,628 A | 4/1998 | Birrittella et al. | |
| 5,889,974 A | * 3/1999 | Harriman et al. ........... | 712/218 |
| 5,970,232 A | 10/1999 | Passint et al. | |
| 6,016,510 A | 1/2000 | Quattromani et al. | |
| 6,023,753 A | 2/2000 | Pechanek et al. | |
| 6,055,618 A | 4/2000 | Thorson | |
| 6,101,181 A | 8/2000 | Passint et al. | |
| 6,167,502 A | 12/2000 | Pechanek et al. | |
| 6,170,063 B1 | * 1/2001 | Golding ...................... | 713/502 |
| 6,260,095 B1 | * 7/2001 | Goodrum .................... | 710/310 |
| 6,298,407 B1 | * 10/2001 | Davis et al. ................ | 710/314 |
| 6,324,599 B1 | * 11/2001 | Zhou et al. .................... | 710/26 |
| 6,453,375 B1 | * 9/2002 | Derr et al. .................. | 710/200 |
| 6,678,804 B1 | * 1/2004 | Funatogawa et al. ....... | 711/154 |

FOREIGN PATENT DOCUMENTS

| | | |
|---|---|---|
| EP | 0 785 512 | 7/1997 |
| WO | 99/26429 | 5/1999 |

OTHER PUBLICATIONS

Bradley Kuszmaul, Mercury Computer Systems, Inc., "The RACE Network Architecture," (posted at www.mc.com/techlit/#tech_brief prior to this), 6 pages.

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD-98-1031, 16 pages.

Prasant Mohapatra, Wormhole Routing Techniques for Directly Connected Multicomputer Systems, ACM Computing Surveys, vol. 30, No. 3, Sep. 1998, 37 pages.

(Continued)

Primary Examiner—Mano Padmanabhan
Assistant Examiner—Jasmine Song
(74) Attorney, Agent, or Firm—Robert C. Kowert; Meyertons, Hood, Kivlin, Kowert & Goetzel, P.C.

(57) ABSTRACT

A method may involve: receiving a request to perform a block write to a target device and data associated with the block write; buffering the data associated with the block write prior to completing the block write to the target device; storing an indication identifying a block address range of the block write; receiving a request to perform a read to the target device; and determining whether an address of the read is within the block address range of the block write identified by the indication. In some embodiments, such a method may allow the read to complete ahead of the block write dependent on whether the address of the read is within the block address range of the block write identified by the indication.

17 Claims, 5 Drawing Sheets

OTHER PUBLICATIONS

Christopher Glass and Lionel Ni, "The Turn Model for Adaptive Routing," Journal of the Association for Computing Machinery, vol. 41, No. 5, Sep. 1994, pp. 874–902.

Reddy, Dept. of Computer & Information Sciences, "A Dynamically Reconfigurable WDM LAN Based on Reconfigurable Circulant Graph," IEEE, 1996, 4 pages.

Various, Abstracts beginning with Funahashi, Jouraku and Amano, "Adaptive Routing for Recursive Diagonal Torus," Transactions of the Institute of Electronics, Information and Communication Engineers D–I, vol. J83D–I, No. 11, Nov. 2000, pp. 1143–1153.

Milan Kovacevic, Center for Telecommunications Research, "On Torus Topologies with Random Extra Links," IEEE 1996, pp. 410–418.

Dally, et al., The Torus Routing Chip, Distributed Computing, Springer–Verlag 1986, pp. 187–196.

Susan Hinrichs, "A Compile Time Model for Composing Parallel Programs," IEEE Parallel and Distributed Technology, 1995, 19 pages.

"CRAY T3D System Architecture Overview Manual," ftp://ftp.cray.com/product–info/mpp/T3D_Architecture_Over/T3D.overview.html, Cray Research, 1993, 40 pages.

Marco Fillo, et al., "The M–Machine Multicomputer," Laboratory for Computer Science, Massachusetts Institute of Technology, A.I. Memo No. 1532, Ann Arbor,. Mar. 1995, 14 pages.

Noakes, et al., "The J–Machine Multicomputer: An Architectural Evaluation," Proceedings of the $20^{th}$ International Symposium on Computer Architecture, May 1993, 12 pages.

Dally, et al., "Architecture of a Message–Driven Processor," International Conference on Computer Architecture, Jun. 1987, pp. 189–196.

Dennison, Lee and Dally, "High–Performance Biderectional Signally in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High–Performance Communication Substrate for Parallel Computers," Proceedings of the First International Parallel Computer Routing and Communication Workshop, Seattle WA, May 1994, 15 pages.

Dennison, et al., "Low–Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicompter Networks," Dept. of Electrical Engineering and Computer Science , Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomson Leighton, Morgan Kaufmann Publishers, 1992, pp. 1–831.

Christopher J. Glass and Lionel Ni, "Fault–Tolerant Wormhole Routing in Meshes," Technical Report, MSU–CP-S–ACS–72, Oct. 30, 1992 (revised May 25, 1993), 28 pages.

Stefan Savage and John Wilkes, "AFRAID–A Frequently Redundant Array of Independent Disks," Proceedings of the 1996 USENIX Technical Conference, pp. 27–29, San Diego, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU–CP-S–ACS–44, Oct. 10, 1991 (revised Mar. 2, 1992), pp. 278–287 (numbered herein as 1–20).

Thomas Stricker, "Message Routing on Irregular 2D–Meshes and Tori," School of Computer Science, Carnegie Mellon Univ., Jan. 15, 1991, pp. 170–177 (numbered herein as 1–19).

Dally, et al., "The J–Machine: A Restrospective," in 25 Years of the International Symposia on Computer Architecture— Selected Papers, Pp. 54–58.

* cited by examiner

WRITE POSTING MEMORY INTERFACE WITH BLOCK-BASED READ-AHEAD MECHANISM

BACKGROUND

1. Field of the Invention

This invention relates to computer systems and, more particularly, to maintaining data correctness in the presence of outstanding write operations within a computer system.

2. Description of the Related Art

When transferring data between components of differing speeds, the transfer must usually take place using the slower component's transfer rate. However, write posting buffers are often used to buffer data transferred by a faster component at its maximum transfer rate until a slower component can remove that data from the write posting buffer at its transfer rate. Accordingly, write posting buffers may effectively speed-match components having different transfer rates. Write posting buffers are typically used to buffer relatively small data transfers (e.g., several bytes) to system memory.

Using a write-posting buffer may introduce additional latency or complication for read operations in order to maintain data correctness. Some write-posting buffers block all outstanding reads until any outstanding writes have completed to memory in order to avoid providing stale data in response to a read. Other write posting buffers employ read ahead mechanisms, which allow reads to addresses that are not targeted by any of the posted writes to progress before the outstanding posted writes have completed. Still other write posting buffers include read forwarding mechanisms, which allow a read to complete by forwarding data from the posted write buffer if the read targets an address targeted by an outstanding write.

SUMMARY

Various embodiments of systems and methods for implementing block-based read-ahead mechanisms are disclosed. In one embodiment, a method may involve: receiving a request to perform a block write to a target device and data associated with the block write; posting the data associated with the block write prior to completing the block write to the target device; storing an indication identifying a block address range of the block write; receiving a request to perform a read; and determining whether an address of the read is within the block address range of the block write identified by the indication. In some embodiments, such a method may allow the read to complete ahead of the block write dependent on whether the address of the read is within the block address range of the block write identified by the indication.

In some embodiments, a write-posting interface may include a read-ahead unit configured to receive a request to perform a block write to a target device and a subsequent request to perform a read to the target device, address range storage, and a write-post buffer. The read-ahead unit may be configured to post data for the block write in the write-post buffer prior to completion of the block write to the target device and to store an indication of an address range targeted by the block write in the address range storage. The read-ahead unit may also be configured to determine whether an address targeted by the read is within the address range identified by the indication stored in the address range storage. The read-ahead unit may be configured to allow the read to complete ahead of the block write dependent on whether the address targeted by the read is within the address range identified by the indication.

A system may include an initiating component, a component accessed by the initiating component, and a write-posting interface coupling the initiating component and the component accessed by the initiating component. The write-posting interface is configured to receive a request initiating a block write to the component from the initiating component and to responsively store an indication of an address range targeted by the block write and post data associated with the block write prior to completion of the block write to the component. The write-posting interface may also be configured to receive a request initiating a read to the component from the initiating component and to responsively determine whether an address associated with the read is within the address range identified by the stored indication. The initiating component may be configured to only initiate block writes targeting address ranges beginning on predetermined block address boundaries in some embodiments.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
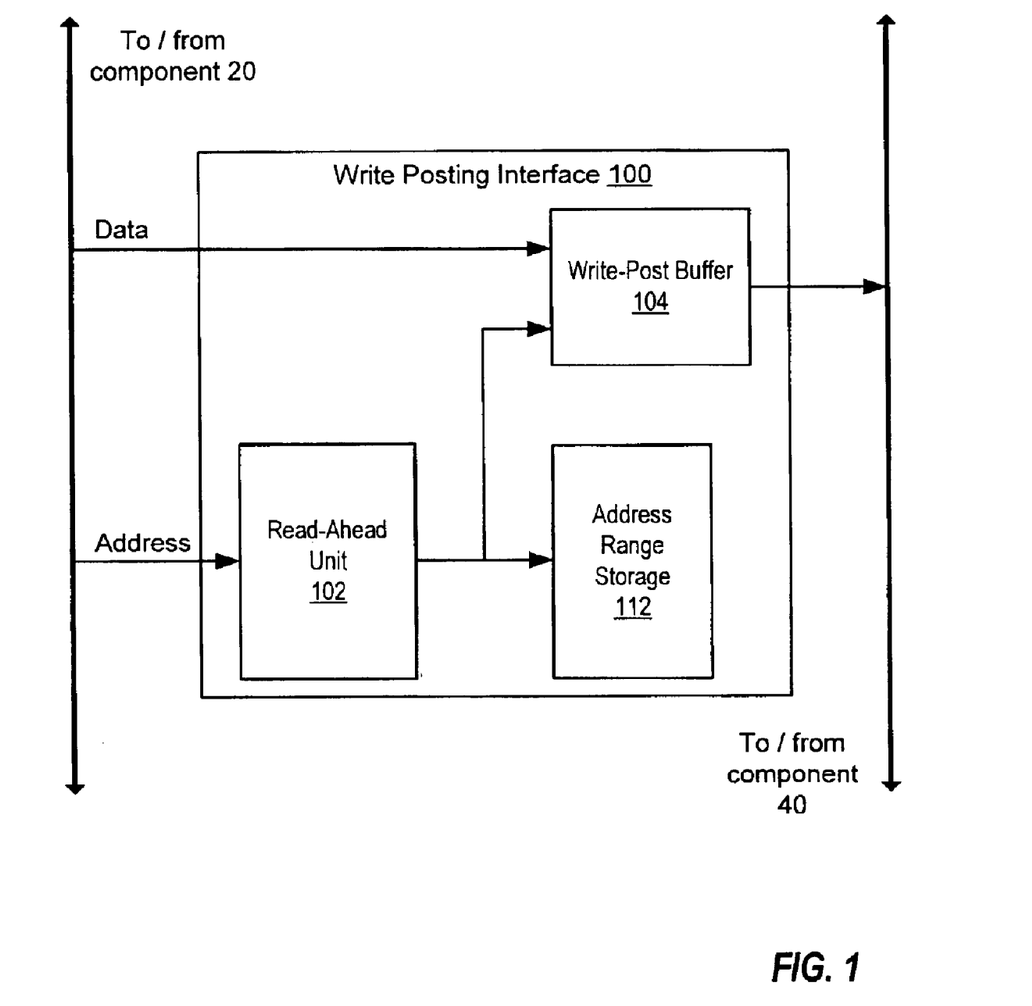
FIG. 1 illustrates a computer system, according to one embodiment.

FIG. 1 illustrates one embodiment of a computer system configured to perform read-ahead write-posting for block data transfers. In this embodiment, a write-posting interface 100 couples two components 20 and 40. One component (e.g., component 20) may be configured to transfer data more quickly than the other component (e.g., component 40), and thus write-posting interface 100 may provide speed-matching between components 20 and 40 by allowing each component to transfer data from write-posting interface 100 at its own rate.

Write-posting interface 100 includes a write-post buffer 104, a read-ahead unit 102, and address storage 112. At least one of components 40 includes (or is) a memory or storage device that is being read and/or written by the other component 20. For example, component 20 may be a host computer system that reads and writes to one or more storage devices included in a storage array 40, and write-posting interface 100 may be included in a storage array controller that couples the host 20 to the storage array 40. Alternatively, component 20 may be a device that reads and writes a storage device 40 (e.g., a disk drive) and write-posting interface 100 may be included in a controller that controls the operation of storage device 40. In other embodiments, component 20 may be a processing device that writes to a system memory 40 and write-posting interface 100 may be included in a system memory controller.

Data written from one component 20 to component 40 by performing a block write is posted (i.e., temporarily buffered) in write-post buffer 104 by read-ahead unit 102. The write-posting interface 100 may signal completion of a posted write to the initiating device once the write data is buffered in write-post buffer 104, even though the write has not actually completed to the target device. As used herein, write posting involves an intermediate device buffering data associated with a write prior to completion of the write to the target device. Write-post buffer 104 is an example of a means for posting the data associated with a block write.

Read-ahead unit 102 may store an indication of the address range written by the block write in address range storage 112. An indication of an address range includes information identifying both the starting and ending points of that address range or information identifying both an endpoint of the range and the size of the range. Address range storage 112 is an example of means for storing an indication identifying a block address range of a block write.

A block of data typically includes multiple sequentially addressed units of data. Performance of the block write from component 20 to the write-posting interface 100 may take several address and data transfers on a bus or other interconnect coupling component 20 to write-posting interface 100. However, read-ahead unit 102 may store fewer indications of the address range than there are address cycles or other address indications on the bus or interconnect. In other words, instead of storing an address for each transfer used to communicate the block write data to the write-posting interface 100, read-ahead unit 102 may store an indication of an address range that is associated with several of those transfers. For example, component 20 may initiate four address cycles in order to perform four burst data transfers implementing the block write, and write-posting interface 100 may responsively store a single indication of the address range written by the block write. Described another way, the write-posting interface 100 may store a single address range indication representing the entire block of data being written instead of storing an address for each individual data unit included in the block.

Once the block of data is removed from the write-post buffer 104 (e.g., when the block of data is written to component 40), read-ahead unit 102 may remove the indication of the associated address range from address range storage 112.

In response to initiation of a read, read-ahead unit 102 may determine whether the read address is within any of the write address ranges for which indications are stored in address range storage 112. If the read address is within any of the write address ranges stored in address range storage 112, the read-ahead unit may postpone the read until completion of the outstanding posted writes. If the read address is not within any of the address ranges stored in address range storage 112, the read-ahead unit 102 may allow the read to complete ahead of the outstanding posted writes. In some embodiments, a read may also have an associated address range. Read-ahead unit 102 may determine that the read address range is within a write address range if the read address range overlaps with any of the outstanding posted writes' address ranges identified in address range storage 112. Read-ahead unit 102 is an example of a means for determining whether an address of a subsequent read is within an address range associated with an earlier write.

By storing an address range for each block (instead of storing all of the addresses associated with each block), the operation of and/or hardware implementing write-posting interface 100 may be simplified since it is no longer necessary to store and search all of the addresses associated with each block stored in write-post buffer 104. For example, determining whether a read address overlaps or is included within an address range associated with a block may take less time and/or hardware than comparing the read address to every address associated with that block. Similarly, for a given size of write-post buffer 104, the amount of storage 112 required to store address ranges may be less than the amount of storage required to store all of the addresses associated with each block.

Note that in some embodiments, write-posting interface 100 may also be configured to perform read-forwarding. In such embodiments, instead of postponing reads that are within an outstanding posted write's address range, the write-posting interface 100 may forward data from the write-post buffer 104 to at least partially satisfy the read before completion of the outstanding posted writes.

Figure 2:
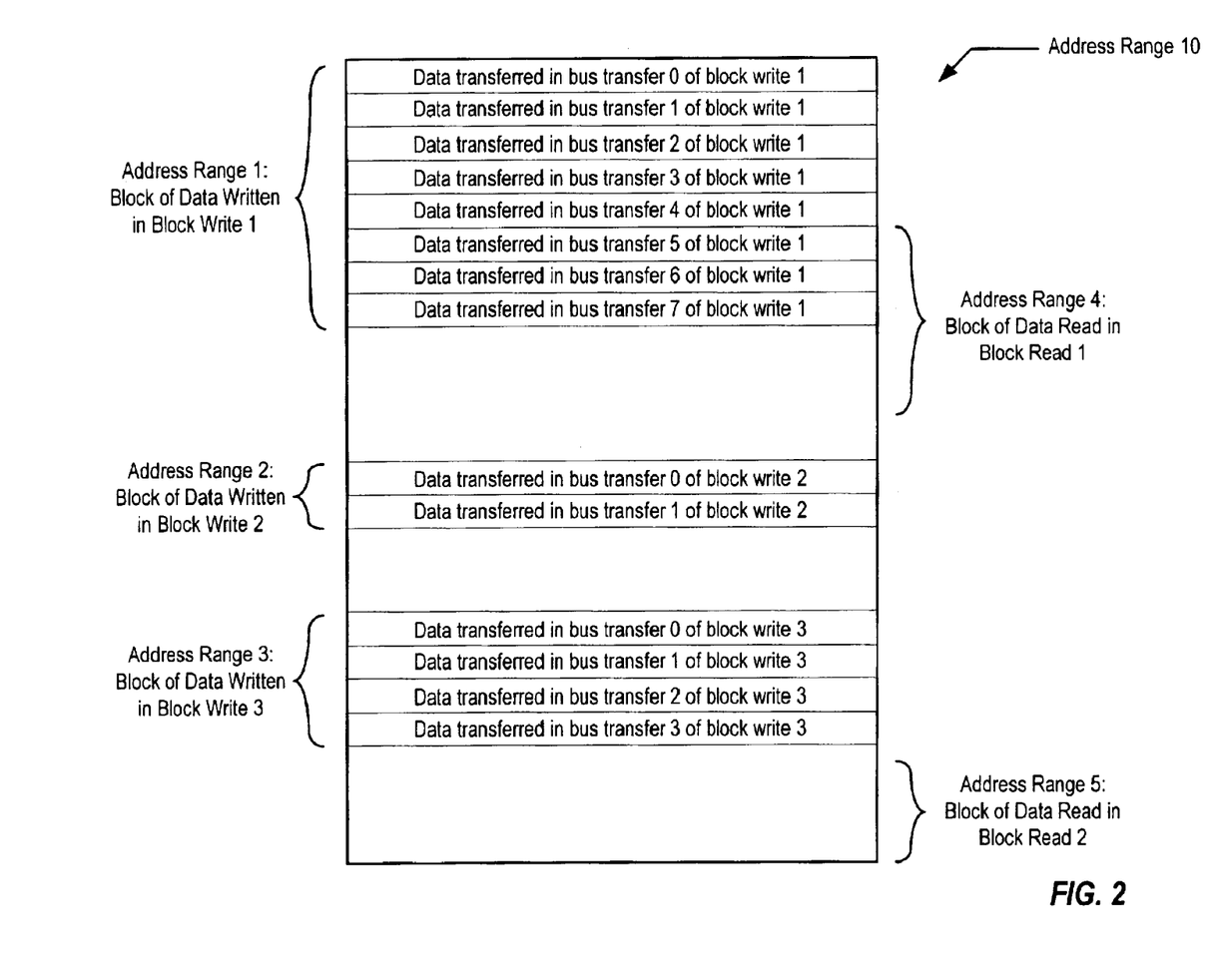
FIG. 2 illustrates an exemplary set of block writes that may be handled by a write-posting interface, according to one embodiment.

FIG. 2 illustrates an exemplary range 10 of addresses corresponding to a memory device included in component 40. Address ranges affected by several block accesses initiated by component 20 are labeled Address Range 1–Address Range 5. Address Range 1 is an address range written by block write 1. Performance of block write 1 requires eight transfers on the interconnect coupling component 20 to write-posting interface 100. These eight transfers may be burst transfers in some embodiments. An address cycle or other indication of the address targeted in each transfer may be generated by component 20 for each of the 8 transfers. One or more data transfers may be performed on the interconnect for each address transfer. Write-posting interface 100 may store fewer than eight indications of the address range written by block write 1. For example, write-posting interface 100 may store a single indication of the address range written by block write 1.

Address Range 2 is an address range written by block write 2. Performance of block write 2 requires 2 transfers on the interconnect coupling component 20 to write-posting interface 100. These transfers may be similar to those performed during block write 1. Write-posting interface 100 may store a single indication of the address range written by block write 2. Similarly, Address Range 3 is an address range written by block write 3, which is performed in four transfers on the interconnect. As shown in this example, block writes of different sizes may be initiated by component 20 in some embodiments.

Address Ranges 4 and 5 correspond to the address ranges read by block reads 1 and 2 respectively. In response to component 20 initiating block read 1, write-posting interface 100 may compare Address Range 4 to the address ranges associated with the outstanding posted writes, which in this example are block writes 1–3. Write-posting interface 100 may read the indications of Address Ranges 1–3 from address range storage 112 and use these indications to determine whether Address Range 4 overlaps with any of the address ranges associated with the outstanding posted writes. Since Address Range 4 overlaps with Address Range 1 written by block write 1, write-posting interface 100 may postpone block read 1 until completion of the outstanding posted writes. Write-posting interface 100 may similarly compare Address Range 5 to the address ranges associated with the outstanding posted writes. Since Address Range 5 does not overlap with any of the outstanding block writes' address ranges, write-posting interface 100 may allow block read 2 to complete before the outstanding posted writes are complete.

Figure 3A:
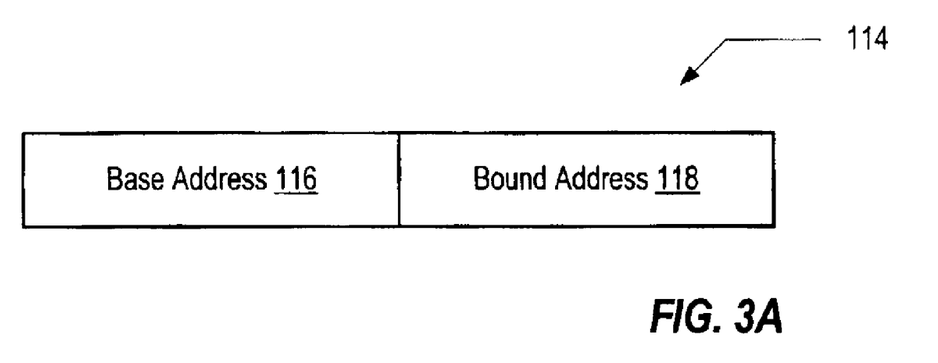
FIGS. 3A–3B show exemplary address range indications that may be used in some embodiments.
Figure 3B:
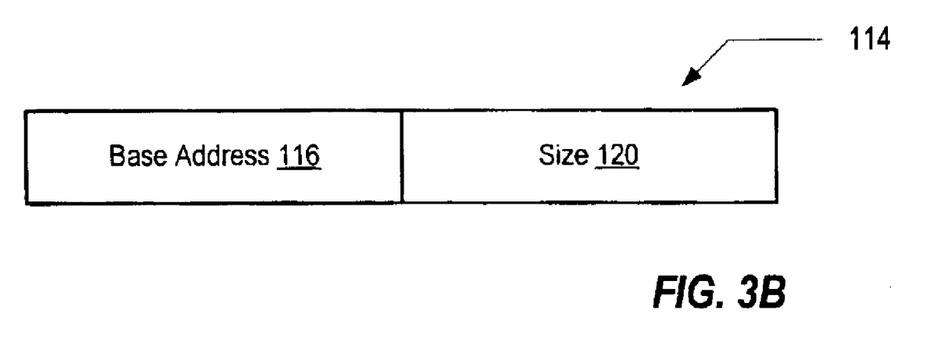

FIGS. 3A and 3B illustrate exemplary address range indications 114 that may be stored in address range storage 112 by write-posting interface 100 in some embodiments. Note that many other indications may be used in other embodiments. In the embodiment of FIG. 3A, each address range associated with a block write is identified by an indication 114 that includes a base address 116 and a bound address 118. In such an embodiment, component 20 may be allowed to initiate block writes and block reads on any address boundary of a memory device included in component 40. Write-posting interface 100 may determine whether a read address is within any of the outstanding block writes' addresses by comparing each read address to both the base address and bound address of each outstanding block write's address range. If the read address is both greater than an block write's base address and less than that block write's bound address, the write-posting interface 100 may identify that read's address as within an outstanding block write's address range and postpone the read. If the read's address is not within any outstanding block write's address range, the write-posting interface 100 may allow the read to complete before the outstanding block writes.

In FIG. 3B, an indication 114 of an outstanding block write's address range includes a base address 116 and a size 120. In one embodiment using such indications, component 20 may be limited to initiating block accesses of at least a minimum block size or an integer multiple of a minimum block size. The size field 120 may store an integer representing the size of the address range as a number of minimally-sized blocks. For example, if the minimum block size is 2K and a block write's address range spans 4K, the size field 120 of the indication 114 for that address range may be set to 2.

In some embodiments, component 20 may be restricted to initiating block writes targeting address ranges beginning and/or ending at predetermined block address boundaries. The granularity of the accessible address boundaries may be the same granularity represented by the size field 120 of the address range indication 114 in embodiments that have a size field 120.

Restricting component 20's block accesses to predetermined block address boundaries may simplify address range comparisons. For example, write-posting interface 100 may mask out a number of bits of the base address 116, based on the address boundary restriction, before comparing the base address 116 to a read address. If a portion of the read address matches the remaining portion of the base address 116, the write-posting interface 100 may determine that the read is within the outstanding write's address range.

Note that in some embodiments that use indications such as shown in FIG. 3B, there may be limits on the maximum block size that may be represented by indication 114. In such embodiments, component 20 may be restricted to initiating block writes of less than or equal to a maximum block size that indication 114 may represent. Alternatively, write-posting interface 100 may be configured to store multiple indications 114 for block writes that exceed the maximum block size.

Figure 4:
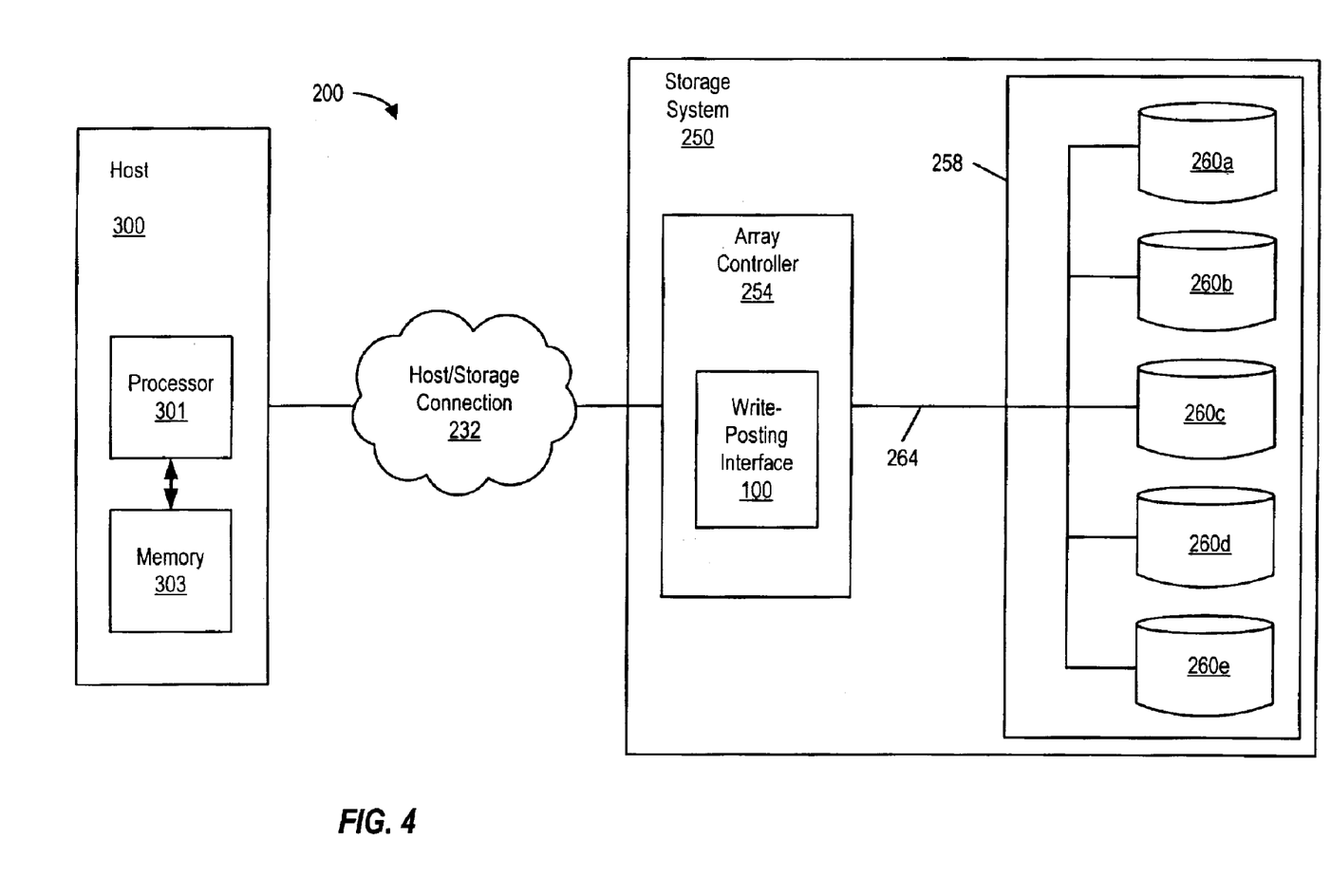
FIG. 4 is a block diagram of a data processing system that includes a write-posting interface according to one embodiment.

FIG. 4 illustrates one embodiment of a data processing system 200 that may include one or more write-posting interfaces 100 capable of handling block accesses as described above with respect to FIGS. 1–3. In FIG. 4, data processing system 200 includes a host 300 connected to a storage system 250 via host/storage connection 232. Host/storage connection 232 may be, for example, a local bus, a network connection, an interconnect fabric, or a communication channel. Storage system 250 may be a RAID (Redundant Array of Independent Disks) storage subsystem or other type of storage array (e.g., a JBOD or Just A Bunch of Disks array). In some embodiments, several hosts 200 may be in communication with storage system 250 via host/storage connection 232. Each host 200 includes at least one memory 303 and processor 301.

Storage system 250 includes a storage device array 258 that includes several storage devices 260a–260e (collectively referred to as storage devices 260). Storage devices 260a–260e may be, for example, magnetic hard disk drives, optical drives, magneto-optical drives, tape drives, solid state storage, or other non-volatile memory. As shown in FIG. 4, storage devices 260 are disk drives and storage device array 258 is a disk drive array. Although FIG. 4 shows a storage device array 258 having five storage devices 260a–260e, it is understood that the number of storage devices 260 in storage device array 258 may vary and is not limiting.

Storage system 250 also includes an array controller 254 connected to each storage device 260 in storage array 258 via one or more data paths 264. Data path 264 may provide communication between array controller 254 and storage devices 260 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc.

Array controller 254 may take many forms, depending on the design of storage system 250. In some systems, array controller 254 may only provide simple I/O connectivity between host 300 and storage devices 260 and the array management may be performed by host 300. In other embodiments of storage system 250, such as controller-based RAID systems, array controller 254 may also include a volume manger to provide volume management, data redundancy, and file management services. In other embodiments of the present invention, the volume manager may reside elsewhere in data processing system 200. For example, in software RAID systems, the volume manager may reside on host 300 and be implemented in software. In other embodiments, the volume manager may be implemented in firmware that resides in a dedicated controller card on host 300. In yet other embodiments, more than one array controller 254 may be provided in storage system 250 to provide for redundancy and/or performance improvements.

As shown, components of data processing system 200 such as array controller 254 may include a write-posting interface 100 that handles block accesses as described above. In the example of FIG. 4, array controller 254 may receive block writes targeting locations within storage array 258 from host 300 over host/storage connection 232. Array controller 254 may then forward these accesses to one or more individual devices 260 within storage array via interconnect 264. Block writes initiated by host 300 may be posted within write-posting interface 100 and an indication of the address range associated with each outstanding posted write may be stored within write-posting interface 100. Write-posting interface 100 may use these indications to determine whether reads initiated by host 300 overlap with any of the outstanding posted writes' address ranges. If a read is not within the address range of any outstanding posted write, write-posting interface 100 may allow that read to complete ahead of the outstanding posted writes.

Note that other components within data processing system 200 may also include write-posting interfaces. For example, one or more components within host 300 (e.g., a network interface card coupling host 300 to host/storage connection 232) may each include a write-posting interface. Controllers within each storage device 260 may also include write-posting interfaces.

Figure 5:
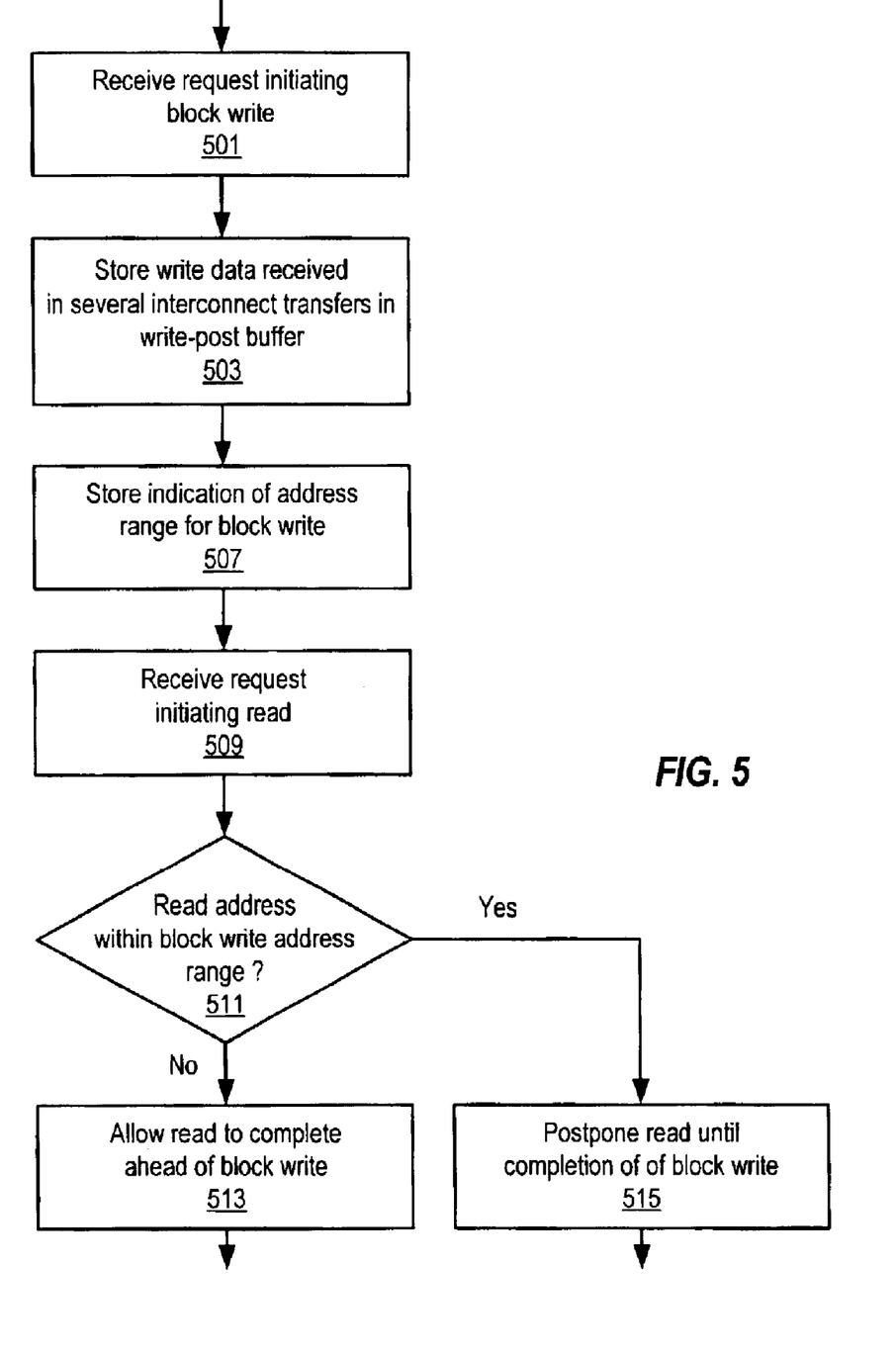
FIG. 5 shows a flowchart of a method of handling reads in the presence of posted block writes, according to one embodiment.

FIG. 5 is a flowchart of one embodiment of a method of handling block writes within a write-posting interface. At 501, a request initiating a block write is received. In response, the block write is posted by storing the write data in a write-post buffer, as indicated at 503, prior to completing the block write to the target device (note that the initiating device may receive an indication that the posted write is complete as soon as the write is posted). Several interconnect transfers are required to receive all of the data for the block write. An indication of the address range associated with the block write is stored at 507. When the block write completes, the write data is removed from the write-post buffer and the indication of the associated address range is removed from the write-posting interface.

At 509, a request initiating a read is received. If the read address is within the block write address range stored at 507 (or if the read address range is within any other outstanding posted write's address range), the read is postponed until completion of the outstanding posted write, as indicated at 511–515. In some embodiments, the determination at 511 may be performed by comparing a read address range associated with the read to each outstanding posted write's address range and determining that the read is within an outstanding posted write's address range, if the read address range overlaps with any outstanding write's address range. In some alternative embodiments, data from the write-post buffer may be used to at least partially satisfy an overlapping read prior to completion of the outstanding posted writes. If the read address is not within any outstanding posted write's address range, the read is allowed to complete ahead of the block write, as indicated at 513.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
   receiving a request to perform a block write to a target device and data associated with the block write;
   posting the data associated with the block write prior to completing the block write to the target device;
   storing an indication identifying a block address range of the block write;
   receiving a request to perform a read to the target device;
   determining whether an address of the read is within the block address range of the block write identified by the indication, wherein said determining further comprises determining whether the address of the read is within any other block address range of any other outstanding block write for which an associated indication is stored.

2. The method of claim 1, further comprising allowing the read to complete ahead of the block write dependent on said determining.

3. The method of claim 1, wherein block writes only target address ranges beginning at predetermined block address boundaries.

4. The method of claim 1, wherein the block write is for multiple separately addressable locations of the target device, wherein said determining further comprises comparing the address of the read to the indication identifying the block address range for each outstanding block write instead of comparing the address of the read to each of multiple separate addresses corresponding to the multiple separately addressable locations of the target device for each outstanding block write.

5. The method of claim 1, wherein the target device is a storage array comprising a plurality of disk drives.

6. The method of claim 1, wherein the target device is a system memory device.

7. A write-posting interface, comprising:
   a read-ahead unit configured to receive a request to perform a block write to a target device and a subsequent request to perform a read to the target device;
   address range storage coupled to the read-ahead unit; and
   a write-post buffer coupled to the read-ahead unit;
   wherein the read-ahead unit is configured to post data for the block write in the write-post buffer prior to completion of the block write to the target device and to store an indication of an address range targeted by the block write in the address range storage; and
   wherein the read-ahead unit is configured to determine whether an address targeted by the read is within the address range identified by the indication stored in the address range storage, wherein the read-ahead unit is further configured to determine whether the address of the read is within any other address ranges identified by other indications stored in the address range storage.

8. The write-posting interface of claim 7, wherein the read-ahead unit is configured to allow the read to complete ahead of the block write dependent on whether the address targeted by the read is within the address range identified by the indication.

9. The write-posting interface of claim 7, wherein the block write is for multiple separately addressable locations of the target device, wherein to determine whether an address targeted by the read is within the address range identified by the indication, the read-ahead unit is further configured to compare the address targeted by the read to the indication of the address range targeted by each outstanding block write instead of comparing the address targeted by the read to each of multiple separate addresses for the multiple separately addressable locations of the target device targeted by each outstanding block write.

10. A system, comprising:
    an initiating component;
    a component accessed by the initiating component; and
    a write-posting interface coupling the initiating component and the component accessed by the initiating component;

wherein the write-posting interface is configured to receive a request initiating a block write to the component from the initiating component and to responsively post data associated with the block write prior to completion of the block write to the component, wherein the write-posting interface is configured to store an indication of an address range targeted by the block write; and wherein the write-posting interface is configured to receive a request initiating a read to the component and to responsively determine whether an address associated with the read is within the address range identified by the stored indication, wherein the write-posting interface is further configured to determine whether the address of the read is within any other address ranges identified by other indications stored by the write-posting interface.

11. The system of claim 10, wherein the write-posting interface is configured to allow the read to complete ahead of the block write dependent on whether the address targeted by the read is within the address range identified by the indication.

12. The system of claim 10, wherein the block write is for multiple separately addressable locations of the component, wherein to responsively determine whether the address associated with the read is within the address range identified by the stored indication, the write-posting interface is further configured to compare the address associated with the read to the indication of the address range targeted by each outstanding block write instead of comparing the address associated with the read to each of multiple separate addresses for the multiple separately addressable locations of the component targeted by each outstanding block write.

13. The system of claim 10, wherein the initiating component is configured to only initiate block writes targeting address ranges beginning on predetermined block address boundaries.

14. The system of claim 10, wherein the component is a storage array, and wherein the write-posting interface is included in a storage array controller.

15. The system of claim 10, wherein the component is a storage device, and wherein the write-posting interface is included in the storage device.

16. The system of claim 10, wherein the component is a memory device, and wherein the write-posting interface is included in a memory controller.

17. A system, comprising;
means for buffering the data associated with a block write prior to completion of the block write to a target device;
means for storing an indication identifying a block address range of the block write; and
means for determining whether an address of a subsequent read is within the block address range identified by the indication stored by the means for storing, wherein said determining further comprises determining whether the address of the read is within any other block address range of any other outstanding block write for which an associated indication is stored.

* * * * *